United States Patent
Isami et al.

(10) Patent No.: US 7,652,728 B2
(45) Date of Patent: Jan. 26, 2010

(54) LIQUID CRYSTAL DISPLAY DEVICE COMPRISING A FIRST CONDUCTIVE FILM SURROUNDING REFLECTIVE ELECTRODES AND A SECOND CONDUCTIVE FILM SURROUNDING THE FIRST CONDUCTIVE FILM AND PROJECTOR HAVING THE SAME

(75) Inventors: Hironobu Isami, Chiba (JP); Eiichirou Itou, Mobara (JP); Takashi Sekimoto, Yokohama (JP); Katsumi Matsumoto, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 201 days.

(21) Appl. No.: 11/386,938

(22) Filed: Mar. 23, 2006

(65) Prior Publication Data

US 2006/0215083 A1    Sep. 28, 2006

(30) Foreign Application Priority Data

Mar. 25, 2005    (JP)    ............................. 2005-088111

(51) Int. Cl.
*G02F 1/1333* (2006.01)
*G02F 1/1343* (2006.01)
*G02F 1/1345* (2006.01)

(52) U.S. Cl. .................. 349/40; 349/139; 349/149

(58) Field of Classification Search ............... 349/40, 349/54–55, 139, 149–152, 192
See application file for complete search history.

(56) References Cited

U.S. PATENT DOCUMENTS

| | | | | | |
|---|---|---|---|---|---|
| 5,764,320 | A | * | 6/1998 | Konuma et al. | 349/40 |
| 6,100,947 | A | * | 8/2000 | Katayama | 349/38 |
| 6,333,769 | B1 | * | 12/2001 | Suzuki et al. | 349/40 |
| 6,636,279 | B2 | * | 10/2003 | Takasugi et al. | 349/40 |
| 6,646,693 | B2 | * | 11/2003 | Zhang et al. | 349/54 |
| 6,726,330 | B2 | * | 4/2004 | Kitabayashi | 353/31 |
| 2004/0027502 | A1 | * | 2/2004 | Tanaka et al. | 349/40 |
| 2004/0227862 | A1 | * | 11/2004 | Kweon et al. | 349/40 |

* cited by examiner

*Primary Examiner*—Andrew Schechter
*Assistant Examiner*—Charles Chang
(74) *Attorney, Agent, or Firm*—Stites & Harbison PLLC; Juan Carlos A. Marquez, Esq.

(57) ABSTRACT

A liquid crystal display device prevents an abnormal picture-frame-like frame being displayed outside an effective display region of a liquid crystal display panel even when burrs are generated in a dicing step. A liquid crystal display device includes a liquid crystal display panel having a first substrate and a second substrate and a liquid crystal layer sandwiched between the substrates. The first substrate includes a common electrode on a surface thereof which faces the second substrate in an opposed manner. The second substrate includes reflective electrodes, a first conductive film arranged to surround a periphery of the reflective electrodes, and a second conductive film arranged to surround a periphery of the first conductive film, a common voltage applied to the common electrode is applied to the first conductive film, and a reference voltage (GND) is applied to the second conductive film.

12 Claims, 5 Drawing Sheets

LIQUID CRYSTAL DISPLAY DEVICE COMPRISING A FIRST CONDUCTIVE FILM SURROUNDING REFLECTIVE ELECTRODES AND A SECOND CONDUCTIVE FILM SURROUNDING THE FIRST CONDUCTIVE FILM AND PROJECTOR HAVING THE SAME

BACKGROUND OF THE INVENTION

1. Field of the Invention

The present invention relates to a liquid crystal display device and a projector, and more particularly to a liquid crystal display device which uses a reflective liquid crystal display panel and a projector.

2. Description of the Related Art

As a liquid crystal display device used for a projector, there has been known a reflective liquid crystal display device (see JP-A-2003-271108 (liquid crystal display device)).

As one of the reflective liquid crystal display devices, there has been known a liquid crystal display device which adopts an electrically controlled birefringence mode.

FIG. 6 is a view for explaining a single polarizer twisted nematic mode (SPTN) which is one of the electrically controlled birefringence modes.

As shown in the drawing, an incident light L1 from a light source (not shown in the drawing) is divided into two polarized lights by a polarization beam splitter 15 and light L2 which is constituted of a linearly polarized light is radiated.

Figure 6A:
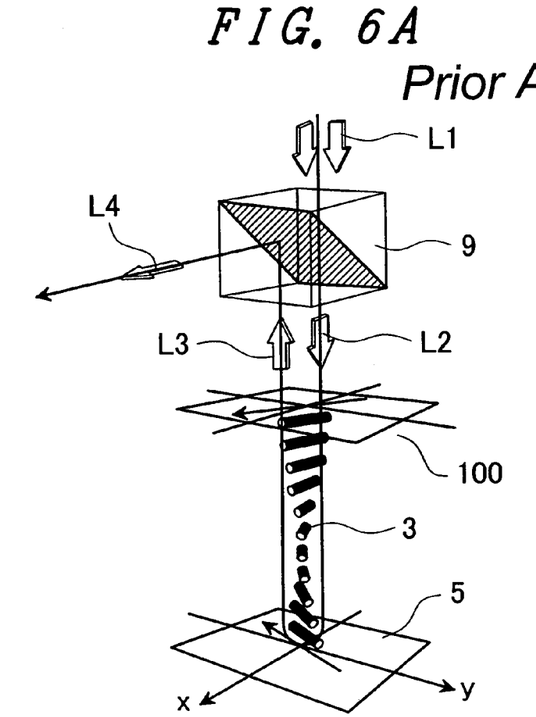
FIG. 6 is a view for explaining a single polarizer twisted nematic mode (SPTN) which constitutes one of electrically controlled birefringence modes.

As shown in FIG. 6A, when a voltage is not applied to liquid crystal, the light which is incident on a liquid crystal panel 100 becomes an elliptically polarized light due to the birefringence of a liquid crystal composition 3 and becomes a circularly polarized light on a reflection electrode 5. The light which is reflected on the reflection electrode 5 passes through the liquid crystal composition 3 again and becomes the elliptically polarized light, and returns to the linearly polarized light at the time of irradiation, and is radiated as a light L3 (S polarized wave) which has a phase thereof rotated by 90 degrees with respect to the incident light L2. Although the radiation light L3 is incident on the polarized beam splitter 15 again, the radiation light L3 is reflected on a polarization surface and becomes an irradiation light L4. This irradiation light L4 is radiated to a screen or the like for performing a display.

The above constitutes a display method which is referred to as a so-called normally white (normally open) in which the light is radiated when the voltage is not applied to the liquid crystal.

Figure 6B:
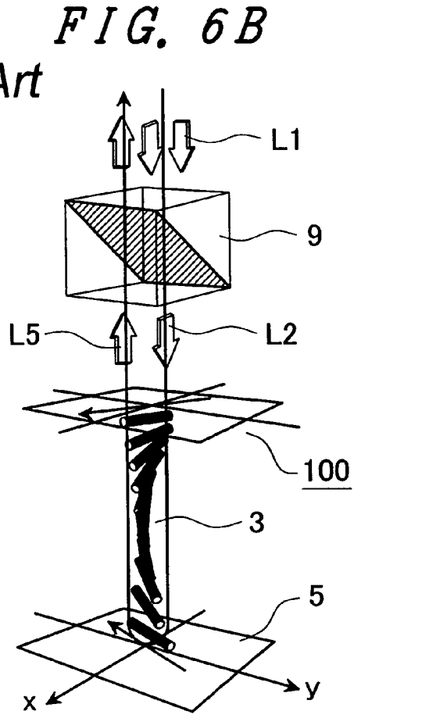

To the contrary, as shown in FIG. 6B, when the voltage is applied to the liquid crystal composition 3, liquid crystal molecules are aligned in the direction of an electric field and hence, a rate that the birefringence is generated in the inside of the liquid crystal is reduced. Accordingly, the light L2 which is incident on the liquid crystal panel 100 as the linearly polarized light is directly reflected on the reflection electrode 5 as it is, and is radiated as a light L5 having the same polarization direction as the incident light L2. The radiated light L5 passes through the polarization beam splitter 15 and returns to the light source. Accordingly, the light is not radiated to the screen or the like thus performing a black display.

SUMMARY OF THE INVENTION

The conventional reflective liquid crystal display device is configured such that liquid crystal is sandwiched between a transparent substrate (for example, a glass substrate) at a side on which the light is incident and a drive circuit substrate (for example, a silicon substrate) which includes a reflective electrode on which the incident light is reflected.

Figure 7:
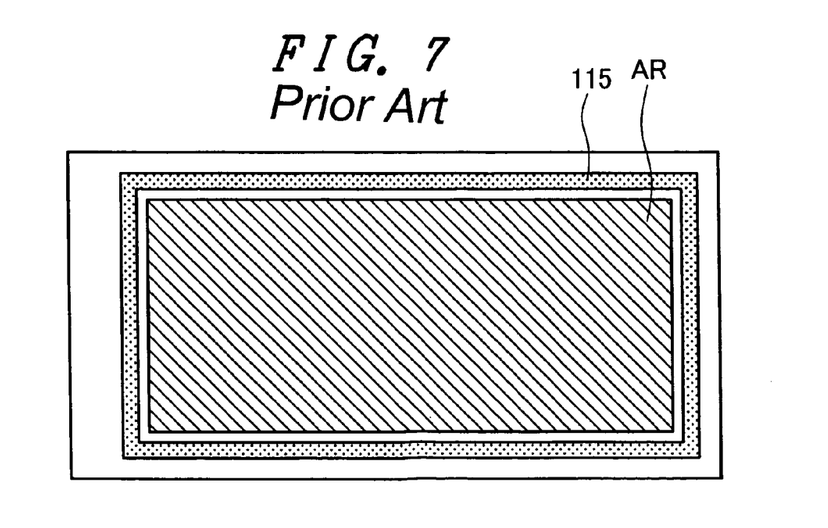
FIG. 7 is a schematic plan view for explaining a drive circuit substrate of a conventional reflective liquid crystal display device.

FIG. 7 is a schematic plan view for explaining the drive circuit substrate of the conventional reflective liquid crystal display device. In the drawing, symbol AR indicates an effective display region in which pixels having reflective electrodes are arranged in a matrix array. A first conductive film 115 is formed around the effective display region (AR) in a state that the first conductive film 115 surrounds the effective display region (AR).

A voltage of Vcom which is applied to a counter electrode is applied to the first conductive film 115. Due to such a constitution, it is possible to prevent a phenomenon that a picture-frame-like irregular frame is displayed outside the effective display region due to the voltage difference between the first conductive film 115 and the counter electrode.

In general, the reflective liquid crystal display device is manufactured by manufacturing a large number of above-mentioned constitutions on one sheet of silicon substrate and, thereafter, by cutting (dicing) the silicon substrate.

However, when burrs are generated in such a dicing step, the first conductive film 115 which is formed in a state that the first conductive film 115 surrounds the effective display region (AR) and a conductive layer (for example, a GND wiring layer) which is formed on the drive circuit substrate and to which a reference voltage (GND) is applied are short-circuited due to such burrs and hence, there exists a possibility that the reference voltage (GND) is applied to the first conductive film 115.

Then, when the first conductive film 115 and a conductive layer which is formed in a drive circuit substrate and to which the reference voltage (GND) is applied are short-circuited due to the burrs which are produced in the dicing step, the reference voltage (GND) is applied to the first conductive film 115.

Accordingly, there has been a drawback that a frame-like abnormal frame is displayed outside the effective display region of the reflective liquid crystal display device thus deteriorating a display quality of the reflective liquid crystal display device.

The present invention has been made to overcome the above-mentioned drawback of the prior art and it is an object of the present invention to provide a technique which can prevent the displaying of an abnormal picture-frame-like frame outside an effective display region of a liquid crystal display panel even when burrs are generated in a dicing step in a liquid crystal display device or a projector.

The above-mentioned and other objects and novel features of the present invention will become apparent by the description of this specification and attached drawings.

To briefly explain the typical inventions among the inventions described in this specification, they are as follows.

To overcome the above-mentioned drawbacks of the related art, the present invention provides a liquid crystal display device which includes a liquid crystal display panel which has a pair of substrates constituted of a first substrate and a second substrate, and a liquid crystal layer which is sandwiched between the pair of substrates, wherein the first substrate includes a common electrode on a surface thereof which faces the second substrate in an opposed manner, the second substrate includes a plurality of reflective electrodes, a first conductive film which is arranged around the plurality of reflective electrodes such that the first conductive film surrounds the plurality of reflective electrodes, and a second conductive film which is arranged around the first conductive film such that the second conductive film surrounds the first conductive film on a surface thereof which faces the first substrate in an opposed manner, and a common voltage which is applied to the common electrode is applied to the first conductive film, and a reference voltage (GND) is applied to the second conductive film.

Further, the present invention is directed to a projector which includes a light source, a plurality of liquid crystal display devices which modulate light radiated from the light source, and a screen on which the light which is modulated by the respective liquid crystal display devices is projected, wherein one of the plurality of liquid crystal display devices is constituted of the liquid crystal display device described above.

To briefly explain advantageous effects obtained by the typical inventions disclosed in this specification, they are as follows.

According to the liquid crystal display device and the projector of the present invention, it is possible to prevent a phenomenon that an abnormal picture-frame-like frame is displayed outside an effective display region of the liquid crystal display panel even when burrs are generated in a dicing step.

DESCRIPTION OF THE PREFERRED EMBODIMENTS

Hereinafter, embodiments of the present invention are explained in conjunction with attached drawings.

Here, in all drawings for explaining an embodiment, parts having identical functions are given same symbols and their repeated explanation is omitted.

Figure 1:
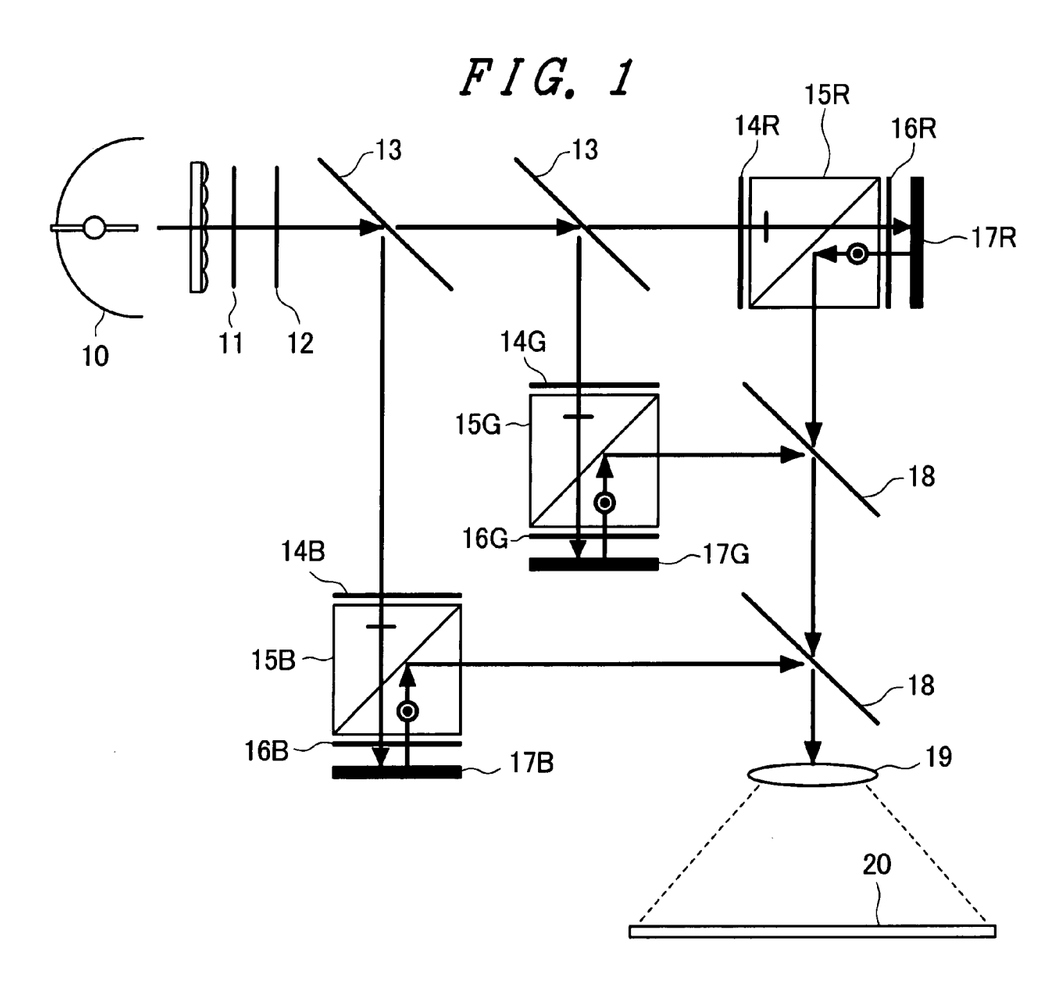
FIG. 1 is a block diagram showing a projector which uses three reflective liquid crystal display devices of R, G and B.

FIG. 1 is a block diagram showing a projector which uses three reflective liquid crystal display devices of R, G and B and constitutes an embodiment of the present invention.

As shown in the drawing, from a white light radiated from a lamp 10, ultraviolet rays and infrared rays are removed using an IR filter 11 and a UV filter 12 thus producing a visible light necessary for a display.

The visible light which passes through the UV filter 12 is subjected to the color separation of R, G, B by a dichroic mirror 13, and the respective color-separated lights pass through respective polarizers (14R, 14G, 14B), respective polarization beam splitters (15R, 15G, 15B) and phase plates (16R, 16G, 16B) and are incident on the reflective liquid crystal display devices (17R, 17G, 17B).

As mentioned previously, in case of the white display performed by the normally-white-method reflective liquid crystal display device, the linearly polarized light which is incident on the reflective liquid crystal display devices (17R, 17G, 17B) becomes a circularly polarized light after passing a liquid crystal layer of a liquid crystal display panel and, thereafter, the circularly polarized light becomes a linearly polarized light which has a phase thereof rotated by 90° with respect to an incident polarization angle after passing through the liquid crystal layer again at the time of reflection.

The linearly polarized lights which are radiated form the reflective liquid crystal display devices (17R, 17G, 17B) pass through the polarization beam splitters (15R, 15G, 15B) and half mirrors 18 and are subjected to color synthesis, and the synthesized light is projected to a projection screen 20 by way of a radiation lens 19. Accordingly, an enlarged image is displayed on the projection screen 20.

Next, the structure of the reflective liquid crystal display device according to this embodiment is explained.

Figure 2:
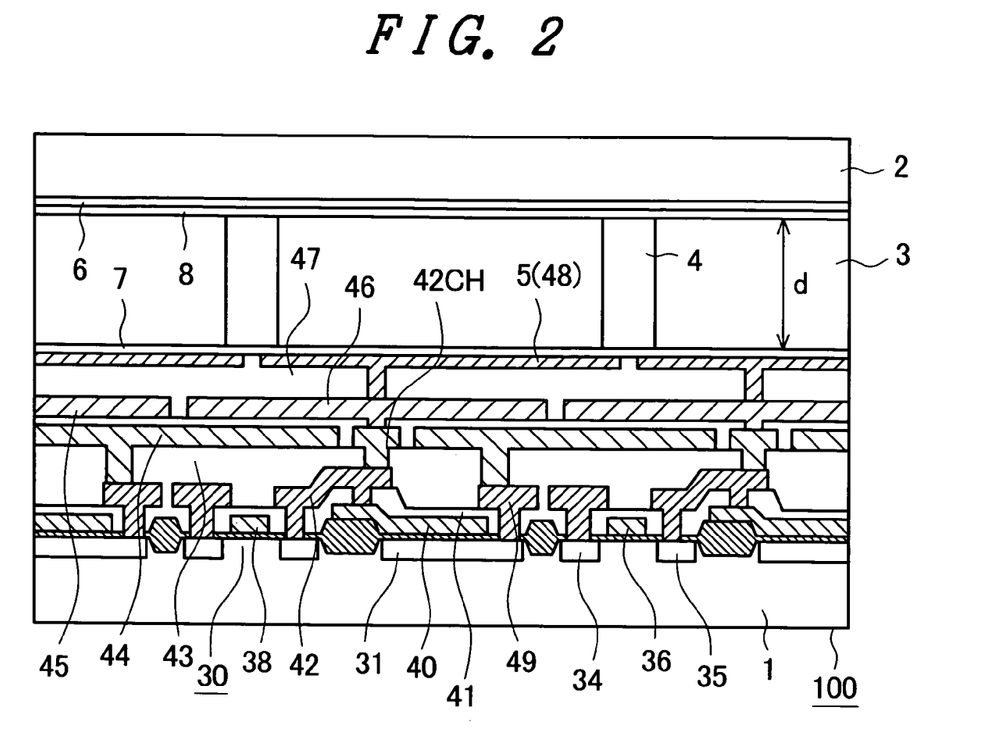
FIG. 2 is a cross-sectional view showing the structure of the reflective liquid crystal display device of an embodiment of the present invention.

In FIG. 2, numeral 100 indicates a liquid crystal display panel, numeral 1 indicates a drive circuit substrate which constitutes a second substrate, numeral 2 indicates a transparent substrate (for example, glass substrate) which constitutes a first substrate, numeral 3 indicates liquid crystal composition, and numeral 4 indicates spacers. The spaces 4 define a cell gap "d" which is a fixed distance between the drive circuit substrate 1 and the transparent substrate 2. The liquid crystal composition 3 is sandwiched in this cell gap "d".

Numeral 5 indicates reflective electrodes (pixel electrodes) which are formed on the drive circuit substrate 1. Numeral 6 indicates a counter electrode and a voltage is applied to the liquid crystal composition 3 between the counter electrode 6 and the reflective electrode 5. Numerals 7, 8 are orientation films which align the liquid crystal molecules in fixed directions.

Numeral 30 indicates an active element and supplies a gray scale voltage to the reflective electrode 5. Numeral 34 indicates a source region of the active element 30. Numeral 35 indicates a drain region of the active element 30, and numeral 36 indicates a gate electrode of the active element 30.

Numeral 38 indicates an insulation film, numeral 31 indicates a first electrode which forms a pixel capacitance, and numeral 40 indicates a second electrode which forms a pixel capacitance. The first electrode 31 and the second electrode 40 form the capacitance by way of the insulation film 38.

Numeral 41 indicates a first interlayer film and numeral 42 indicates a first conductive layer. The first conductive layer 42 electrically connects the drain region 35 and the second electrode 40 with each other. Numeral 43 indicates a second insulation film, numeral 44 indicates a first light blocking film, numeral 45 indicates a third insulation film, and numeral 46 indicates a second light blocking film. A through hole 42CH is formed in the second interlayer film 43 and the third interlayer film 45 thus electrically connecting the first conductive layer 42 and the second light blocking film 46. Numeral 47 indicates a fourth interlayer film, numeral 48 indicates a second conductive layer which forms the reflective electrode 5, and numeral 49 indicates a conductive layer. A gray scale voltage is transmitted to the reflective electrode 5 from the drain region 35 of the active element 30 via the first conductive layer 42, the through hole 42CH and the second light blocking film 46.

The liquid crystal display device of this embodiment is of a reflective type and the liquid crystal display panel 100 is irradiated with a large quantity of light. The light blocking film blocks the light such that the light is not incident on the semiconductor layers of the drive circuit substrate. In the reflective liquid crystal display device, the light which is radiated to the liquid crystal display panel 100 is incident from the transparent substrate 2 side (upper side in FIG. 2), passes through the liquid crystal composition 3 and is reflected on the reflective electrode 5, and again, passes through the liquid crystal composition 3 and the transparent substrate 2, and is radiated form the liquid crystal display panel 100.

However, a portion of the light which is radiated to the liquid crystal display panel 100 leaks into the drive circuit substrate side from a gap between the reflective electrodes 5. The first light blocking film 44 and the second light blocking film 46 are provided for preventing the light from being incident on the active element 30.

In this embodiment, the light blocking film is formed of a conductive layer, the second light blocking film 46 is electrically connected to the reflective electrode 5, and a pixel potential control signal is supplied to the first light blocking film 44 thus allowing the light blocking film to function also as a part of the pixel capacitance.

Further, in this embodiment, an opaque silicon substrate is used as the drive circuit substrate 1. Accordingly, the active elements 30 and lines can be formed below the reflective electrodes 5 and hence, it is possible to obtain an advantage that the reflective electrodes 5 which constitute the pixels can be enlarged thus realizing the so-called high numerical aperture. Further, it is also possible to obtain an advantage that heat generated by the light radiated to the liquid crystal display panel 100 can be dissipated from a back surface of the drive circuit substrate 1.

Figure 3:
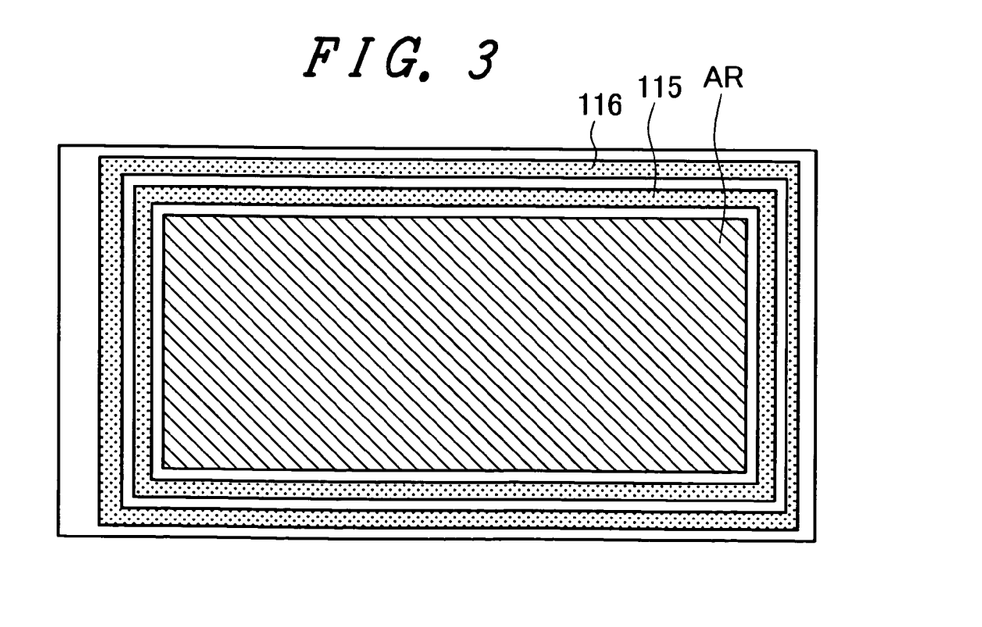
FIG. 3 is a schematic plan view for explaining one example of a drive circuit substrate of the reflective liquid crystal display device of an embodiment of the present invention.

FIG. 3 is a schematic plan view for explaining the drive circuit substrate of the reflective liquid crystal display device of this embodiment. In the drawing, symbol AR indicates an effective display region in which the pixels having the reflective electrodes are arranged in a matrix array. A first conductive film 115 is formed around the effective display region (AR) such that the first conductive film 115 surrounds the effective display region (AR).

A voltage of Vcom which is applied to the counter electrode is applied to the first conductive film 115. Accordingly, it is possible to prevent a phenomenon that an abnormal picture-frame-like frame is displayed outside the effective display region due to the voltage difference between the first conductive film 115 and the counter electrode.

Further, in this embodiment, a second conductive film 116 is formed around the first conductive film 115 such that the second conductive film 116 surrounds the first conductive film 115. A reference voltage (GND) is applied to the second conductive film 116. Here, the first conductive film 115 and the second conductive film 116 are constituted of a metal film.

As mentioned previously, the reflective liquid crystal display devices are manufactured by manufacturing a large number of liquid crystal display devices on one sheet of the silicon substrate and, thereafter, by cutting (dicing) the silicon substrate.

Figure 8:
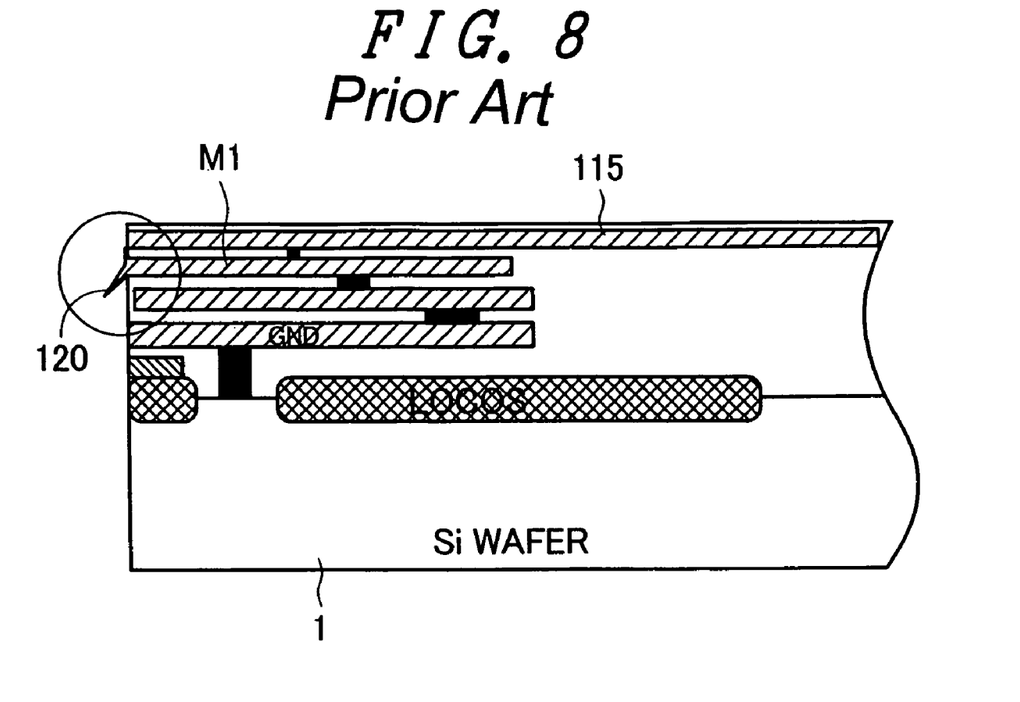
FIG. 8 is a cross-sectional view for explaining a reason that a picture-frame-like frame is displayed outside an effective display region when burrs are generated in a dicing step in the conventional reflective liquid crystal display device.

However, as shown in FIG. 8, in the conventional reflective liquid crystal display panel, there may be a case that due to a burr 120 which is generated during a dicing step, a first conductive film 115 which is arranged to surround an effective display region and a conductive layer (for example, a GND wiring layer) (M1) which is formed in the drive circuit substrate and to which a reverence voltage (GND) is applied are short-circuited. In such a case, the reference voltage (GND) is applied to the first conductive film 115 and hence, an abnormal picture-frame-like frame is displayed outside the effective display region of the reflective liquid crystal display device thus deteriorating the display quality of the reflective liquid crystal display device.

Here, FIG. 8 is a view showing the cross-sectional structure of a side of the drive circuit substrate 1 cut in the dicing step.

However, in this embodiment, the second conductive film 116 is formed around the first conductive film 115 such that the second conductive film 116 surrounds the first conductive film 115 and, at the same time, the reference voltage (GND) is applied to the second conductive film 116.

Figure 4:
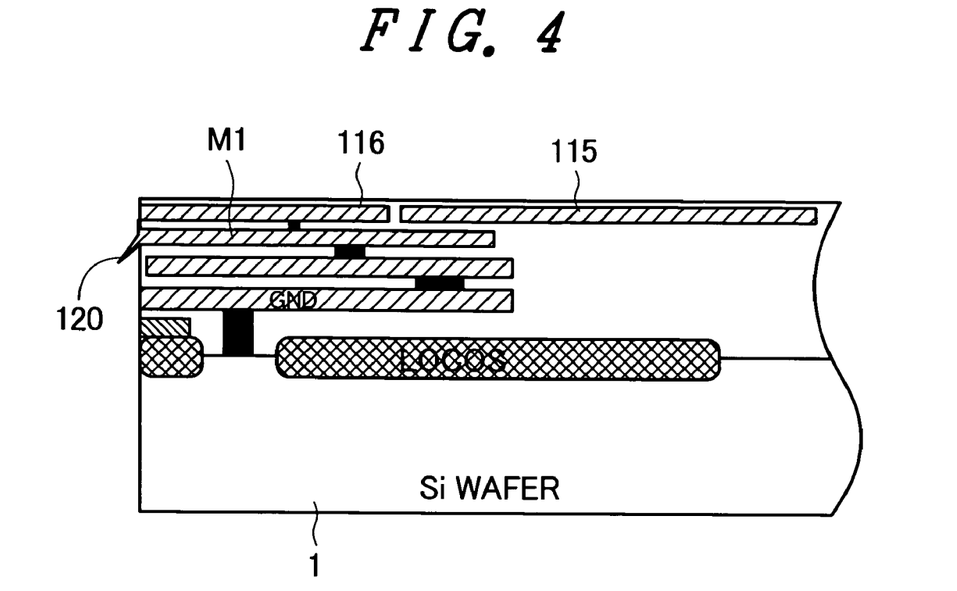
FIG. 4 is a cross-sectional view for explaining a reason that a picture-frame-like frame is not displayed outside an effective display region even when burrs are generated in a dicing step in the reflective liquid crystal display device of the present invention.

Accordingly, as shown in FIG. 4, in this embodiment, even when the burr 120 is generated in the dicing step, a component which is short-circuited with the conductive layer (M1) in the drive circuit substrate is the second conductive film 116 and hence, even when the burr 120 is generated in the dicing step, there is no possibility that the first conductive film 115 and the conductive layer (M1) in the drive circuit substrate are short-circuited.

Accordingly, in this embodiment, it is possible to eliminate a phenomenon that the abnormal picture-frame-like frame is displayed outside the effective display region of the reflective liquid crystal display device.

Here, FIG. 4 is a view showing the cross-sectional structure of a side of the drive circuit substrate 1 cut in the dicing step.

Here, as is evident from the explanation described heretofore, it is not always necessary to apply the reference voltage (GND voltage) to the second conductive film 116. Depending on cases, the voltage may not be applied to the second conductive film 116.

Figure 5:
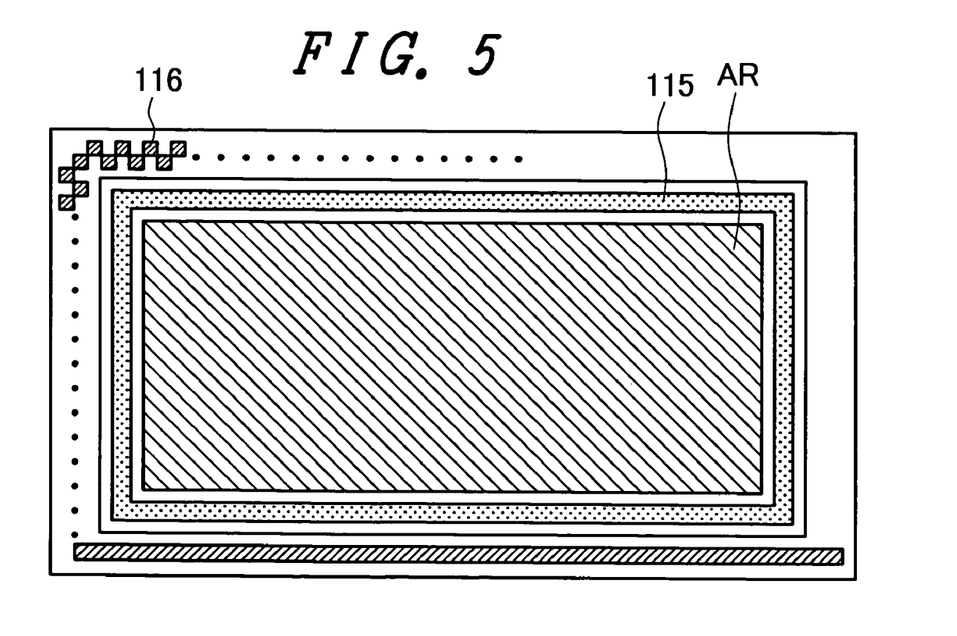
FIG. 5 is a schematic plan view for explaining another example of the drive circuit substrate of the reflective liquid crystal display device of the embodiment of the present invention.

Further, the second conductive film 116 may not be formed in a strip shape provided that the second conductive film 116 is configured to surround the first conductive film 115. For example, as shown in FIG. 5, the second conductive film 116 in a floating state may be formed around the conductive film 115 in an island shape. That is, the second conductive film 116 may be configured such that a plurality of island-like conductors are formed on each side such as an upper side in FIG. 5, while one island like conductor is formed on one side as in the case of the lower side in FIG. 5.

Although the invention made by inventors of the present invention has been specifically explained in conjunction with the above-mentioned embodiments, it is needless to say that the present invention is not limited to the above-mentioned embodiments and various modifications can be made without departing from the gist of the present invention.

What is claimed is:

1. A liquid crystal display device comprising a liquid crystal display panel which includes a pair of substrates constituted of a first substrate and a second substrate, and a liquid crystal layer which is sandwiched between the pair of substrates, wherein the first substrate includes a common electrode on a surface thereof which faces the second substrate in an opposed manner, the second substrate includes a plurality of reflective electrodes, a first conductive film which is arranged around the plurality of reflective electrodes such that the first conductive film surrounds the plurality of reflective electrodes along four sides of the second substrate, and a second conductive film which is arranged around the first conductive film such that the second conductive film surrounds the first conductive film along the four sides of the second substrate on a surface thereof which faces the first substrate in an opposed manner, and during normal display operations of the liquid crystal display device, a common voltage which is applied to the common electrode is applied to the first conductive film, and a voltage applied to the second conductive film is different from the common voltage.

2. A liquid crystal display device according to claim 1, wherein a reference voltage is applied to the second conductive film.

3. A liquid crystal display device according to claim 2, wherein the first substrate is constituted of a glass substrate and the second substrate is constituted of a silicon substrate.

4. A liquid crystal display device according to claim 2, wherein the reference voltage is connected to ground.

5. A liquid crystal display device according claim 1, wherein the second conductive film has a multi-layered structure sandwiching at least one interlayer insulating film.

6. A liquid crystal display device according to claim 5, wherein the first substrate is constituted of a glass substrate and the second substrate is constituted of a silicon substrate.

7. A liquid crystal display device according to claim 5, wherein the first substrate is constituted of a glass substrate and the second substrate is constituted of a silicon substrate.

8. A liquid crystal display device according claim 1, wherein the first conductive film is insulated from the electrodes and conductive lines connected with the electrodes, and the second conductive film is insulated from the first conductive film.

9. A liquid crystal display device according claim 1, wherein the second conductive film which is shaped as a stripe.

10. A liquid crystal display device according claim 1, wherein the second conductive film which is shaped as a plurality of linked islands.

11. A projector comprising:
a light source;
a plurality of liquid crystal display devices which modulate light radiated form the light source; and
a screen on which the light which is modulated by the respective liquid crystal display devices is projected, wherein
one of the plurality of liquid crystal display devices compromise a liquid crystal display panel which includes a pair of substrates constituted of a first substrate and a second substrate, and a liquid crystal layer which is sandwiched between the pair of substrates, wherein the first substrate includes a common electrode on a surface thereof which faces the second substrate in an opposed manner, the second substrate includes a plurality of reflective electrodes, a first conductive film which is arranged around the plurality of reflective electrodes such that the first conductive film surrounds the plurality of reflective electrodes along four sides of the second substrate, and a second conductive film which is arranged around the first conductive film such that the second conductive film surrounds the first conductive film alone the four sides of the second substrate on a surface thereof which faces the first substrate in an opposed manner, and during normal display operations of the liquid crystal display device, a common voltage which is applied to the common electrode is applied to the first conductive film, and a voltage applied to the second conductive film is different from the common voltage.

12. A liquid crystal display device, comprising:
a pair of substrates constituting a first substrate and a second substrate; and
a liquid crystal layer sandwiched between the pair of substrates, wherein
the first substrate includes a common electrode on a surface thereof which is formed to opposingly face the second substrate,
the second substrate includes a plurality of reflective electrodes, a first conductive film formed around the plurality of reflective electrodes such that the first conductive film surrounds the plurality of reflective electrodes along a periphery of the second substrate, and a second conductive film which is arranged around the first conductive film such that the second conductive film surrounds the first conductive film along a periphery of the second substrate on a surface thereof which is formed to opposingly face the first substrate, and
wherein the liquid crystal display device is configured such that, during normal operation thereof, a common voltage applied to the common electrode is applied to the first conductive film, and a voltage applied to the second conductive film is different from the common voltage.

* * * * *

UNITED STATES PATENT AND TRADEMARK OFFICE
CERTIFICATE OF CORRECTION

| | | |
|---|---|---|
| PATENT NO. | : 7,652,728 B2 | Page 1 of 1 |
| APPLICATION NO. | : 11/386938 | |
| DATED | : January 26, 2010 | |
| INVENTOR(S) | : Isami et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this

Twenty-third Day of November, 2010

David J. Kappos
*Director of the United States Patent and Trademark Office*